June 28, 1960     G. WELLENSIEK     2,942,855
RECUPERATOR

Filed Aug. 15, 1956                                  3 Sheets-Sheet 1

INVENTOR
Gert WELLENSIEK
BY
Karl Viertel
ATTORNEY

June 28, 1960 G. WELLENSIEK 2,942,855
RECUPERATOR
Filed Aug. 15, 1956 3 Sheets-Sheet 2
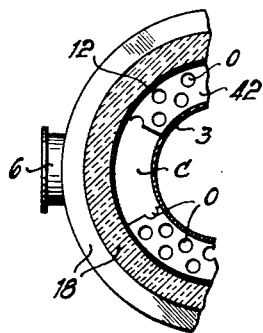
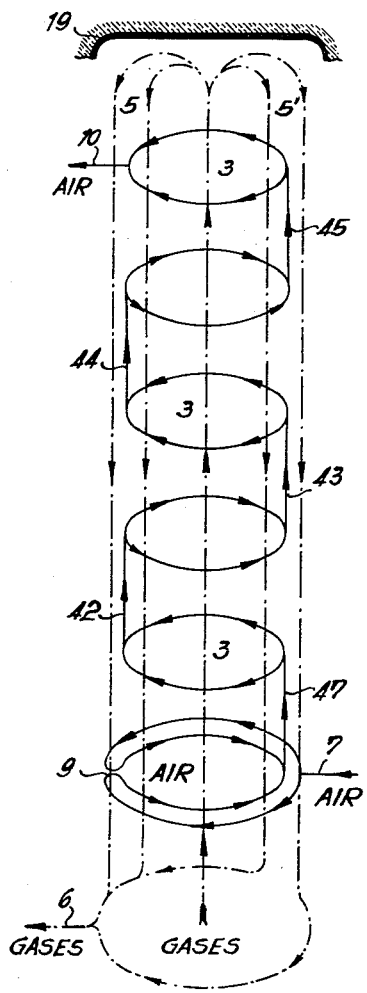
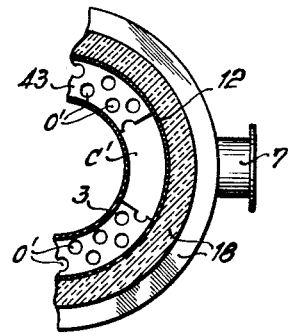
INVENTOR
Gert WELLENSIEK
BY
Karl Viertel
ATTORNEY June 28, 1960 G. WELLENSIEK 2,942,855
RECUPERATOR Filed Aug. 15, 1956 3 Sheets-Sheet 3

INVENTOR
Gert WELLENSIEK
BY
Karl Viertel
ATTORNEY

United States Patent Office 2,942,855
Patented June 28, 1960

2,942,855

RECUPERATOR

Gert Wellensiek, Dusseldorf, Germany, assignor to Rekuperator K.-G. Dr. Ing. Schack & Co., Dusseldorf, Germany Filed Aug. 15, 1956, Ser. No. 604,285

Claims priority, application Germany Aug. 17, 1955

3 Claims. (Cl. 257—222)

My invention relates to improvements in steel tube recuperators or heat exchangers for recovering waste gas heat and preheating combustion air of industrial furnaces, and more particularly to an advanced type of shell and tube combination recuperators, redesigned for cooperation with extremely high temperatured metallurgical furnaces, as shown and described for instance in a British periodical Iron and Coal Trades Review, of January 22 and 29, 1952.

As seen therein, in recent years combination recuperators have been reconstructed for more amply and safely recovering the waste gas heat from soaking pits, and reverberatory furnaces, and for more highly preheating the combustion air delivered thereinto, which comprise a primary heat radiating steel shell compartment, and a secondary or heat convecting multitubular compartment, juxtaposed to or superimposed on the primary heat radiating compartment.

In a French patent specification 1,103,445, a metallic and ceramic combination recuperator is disclosed, wherein the primary shellular and the secondary tubular heat exchanger compartments are annularly nested within each other, and wherein the hottest shell parts are noyé i.e. immersed in a fusing ceramic mass, and have affixed metallic contact elements, by which the transfer of heat is to be increased.

However, it has been found meanwhile, that combination recuperators of that description are not foolproof, namely are still subject to be accidentally overheated, seriously damaged, melted down and completely destroyed:

These dangerous incidents occur each time, when the red or white hot steel billet, heated for rolling out or forging, is withdrawn from the furnace, and when by an oversight or accident the supply of fresh combustion air into the recuperator is not contemporarily and adequately reduced, or by failure in the automatic signalling and controlling devices of the plant.

The principal object of the invention is to provide a structurally improved steel shell tube combination recuperator, which should be more heat resistive and foolproof than prior art predecessors, namely safer against wall-bulging and other deformation troubles, as bending of the tubes, breaking, leaking, melting and collapsing disasters, caused by excessive temperatures and overheating beyond the resistance power of those costly chrome-nickel steels, from which modern recuperators are made.

A most important object of the invention is to rightly and immediately direct the intaken cold combustion air against and around the hottest and most dangerously exposed zone of the heat radiating master steel shell, so as to surely prevent accidental overheating of the latter.

Various other objects, aimed at and advantages obtained by the invention will be recognized hereinafter by practitioners in this field and will be more fully understood from the accompanying drawings, wherein:

Fig. 1 is a front elevation in section, vertically taken through a recuperator, redesigned according to this invention and shown by way of an example, Fig. 2 is a fragmentary plan showing the recuperator's upper end, wherefrom the dome is removed, Figs. 3 and 4 are fragmentary sections on lines III—III, and IV—IV showing baffling plates for re-directing the current of air ascending in the recuperator, Fig. 5 is a diagram showing in perspective the paths of flow of the flue gases and of the air through the recuperator, Fig. 6 is a front elevation in section, vertically taken through a structurally modified recuperator, shown by way of another example.

Figure 1:
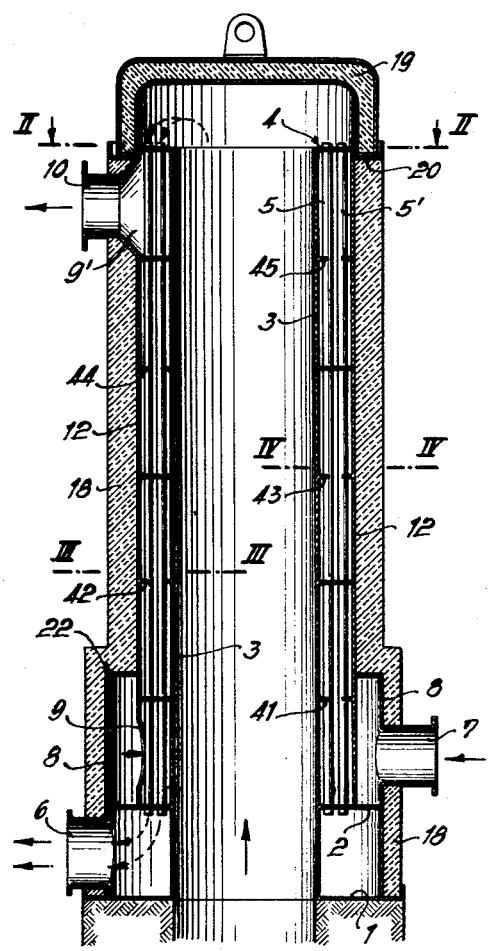
Figure 2:
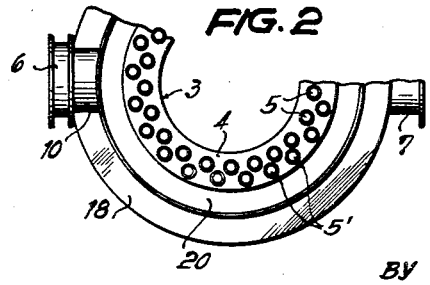

In the recuperator, redesigned according to this invention and for the purposes set forth, there are structurally combined and cooperatively interassociated an upright, refractory, tubular tower, formed with an offset, diametrically widened base, for taking in from underneath the waste gases ascending annular gas collecting and discharging chamber.

According to the invention means are provided in the recuperator for splitting up or dividing the intaken air current and redirecting its course through the recuperator, so as to enhance its cooling effect on the heat radiating shells, and to promote the transfer of heat from the heat convecting tubes to the air.

In the recuperator embodying the invention and depicted in Figs. 1–5, there is disclosed an outer refractory tower 18, surrounding the recuperator proper and located at the refractory flue gas inlet conduit of a furnace.

Tower 18 is closed by a refractory vaulted dome 19, which movably rests on and closes said tower 18 from thereabove.

An annular base plate 1 forms the lowermost part of the recuperator. The recuperator proper comprises an upright master steel shell or tubular element 3, supported by said plate 1 and conducting from a first inlet conduit 3a the slowly ascending heat radiating flue gases from the lower end of the recuperator to the upper end of the same, and into said dome.

Numeral 2 designates an annular foot plate or lower terminal wall, fixed exteriorly of and to the upright tubular element 3 at its lower part and in spaced relation to the base plate 1.

On terminal or foot plate 2 rests an outer tubular end wall 12 concentric with tubular element 3 and extending up to the recuperator's upper part.

The space between said end wall 12 and tubular element 3 defines a hollow wall or chamber which is bounded at its upper end by an annular head plate or upper terminal wall 4 bridging over and closing the gap between the tubular element 3 and tubular end wall 12.

Numerals 5, 5' are spaced apart steel tubes having upper and lower open ends, said open ends being located beyond said terminal wall or plate 2 and terminal wall or plate 4, said tubes being suspended from the latter plate.

Numeral 8 is an outer first ring-shaped chamber bounded by terminal or foot plate 2, and joined to the shell or tubular end wall 12 by a ring plate 22, so as to form said first ring-shaped chamber around the lower part of master shell or tubular element 3, and lower sections of tubes 5, 5'.

Numeral 7 designates an inlet conduit for the air into said first ring-shaped chamber, which is connected by passageway 9 with the aforesaid hollow wall forming a second ring-shaped chamber, whereby, for example, air may pass from inlet conduit 7 via chamber 8 through passageway 9 into said second ring-shaped chamber.

Numeral 6 is an outlet conduit for discharging flue gases leaving the lower open ends of the tubes 5, 5' of the recuperator in cooled off condition.

Numeral 10 is an outlet or discharge conduit at the upper end of the second ring-shaped chamber for discharging preheated air or like medium from the recuperator.

Numerals 41, 42, 43, 44, 45 are annular partition walls or baffle plates with holes therein, through which the tubes 5, 5' extend and with recesses $c$, $c'$ (Figs. 3, 4) through which the air passes on ascending through said second ring-shaped chamber.

As seen in Figs. 3 and 4, and indicated in Fig. 5, said baffle plates have their recesses in diametrically opposed positions and are spaced and in superimposed position upon each other, so as to form a series of annular air ducts, around the tubular element 3.

It is a prominent advantageous feature of the redesigned recuperator, that the cold air, taken in at inlet conduit 7, is divided or bifurcated into two currents in the ring chamber 2, 8, 22, 12, and on passing through aperture or like connecting means 9 will directly impinge upon and circulate around the hottest lower section of the master shell 3, thus preventing overheating of the latter.

An equally important advantageous feature is, that the current of air on ascending and passing through the recesses in the baffle plates, is repeatedly redirected, bifurcated and rewound, so as to flow in a staggered path, seen in Fig. 5, and always crosswisely impinge upon the heat convecting tubes 5, 5'.

Various structural changes and modifications may be resorted to by practitioners in this field, and complementary, advantageous features may be conveniently contemplated in regard to recuperators, as shown and described, without departing from the spirit and leading ideas of this invention:

For instance the inlet port or conduit 7 may be arranged at another angularly displaced point, for instance by 20° or more degrees, of the back-up shell 8, so as to better suit structural local conditions of the plant.

The dome 19 may be fitted with an arched, self supporting refractory brick lining (not shown), so as to save a steel support thereunderneath.

A reenforcing and stiffening ring 20 may be provided at the recuperators upper end.

Figure 6:
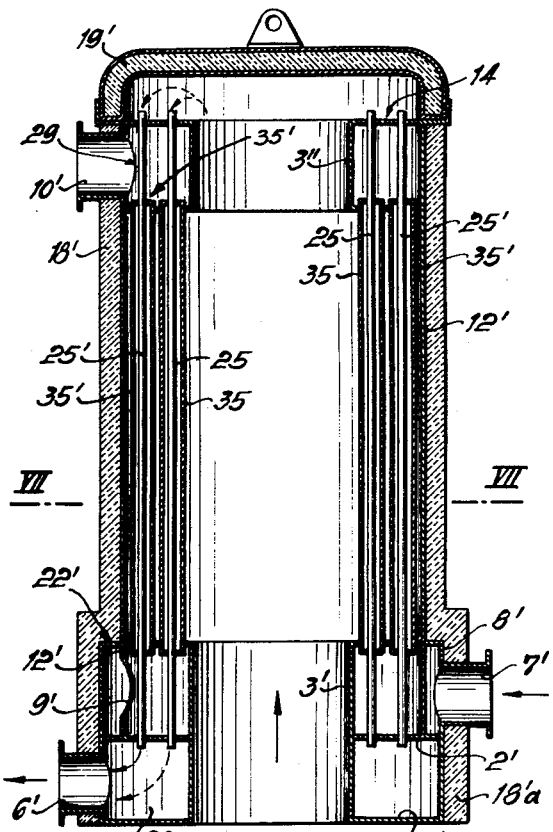
Figures 7, 8:
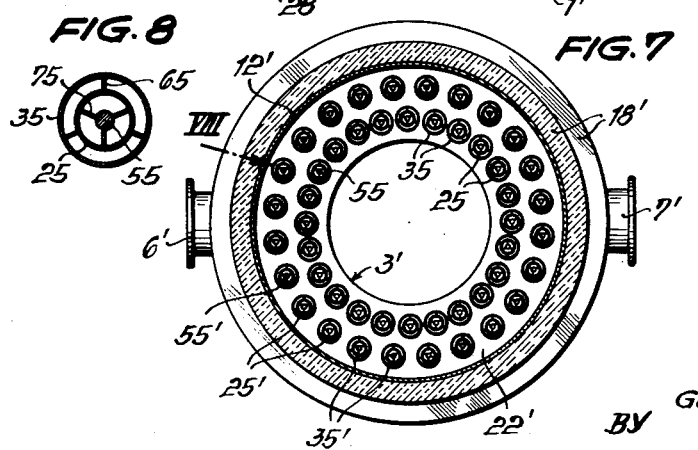
Fig. 7 is a section on line VII—VII in Fig. 6.
Fig. 8 is a section drawing in a larger scale on line VIII in Fig. 7 through an assemblage of heat radiating and convecting tubes and rods, packed and nested in each other.

Structurally modified shellular heat radiating means, and multitubular heat convecting means may be cooperatively rearranged and associated to advantage for the purposes of this invention, as shown in the recuperator, seen in Figs. 6–8.

Therein is: numeral 1', a base plate, numeral 2', a foot plate; numeral 7' is an air inlet port in the back-up shell 8', numeral 12' is a companion shell, numeral 9' and numeral 29 designate apertures in shell 12' for the passage of air therethrough, numeral 10' is an air outlet port at the recuperators upper end, numeral 6' is a gas outlet port in an annular gas chamber 28 at the recuperators base, numeral 22' is a ring joining the companion shell 12' with the back-up shell 8', numeral 18' is a refractory tubular tower formed with an offset or diametrically widened base 18', numeral 19' is a refractory dome, numeral 14 is the recuperators head plate.

In this case the inner heat radiating master shell is made in two parts, a lower section 3', and, spaced therefrom, an upper section 3", by which annular gas and air chambers are enclosed at the recuperators base and upper end, numerals 25, 25' are open ended heat convecting gas tubes, which go through the head plate 14, being suspended therefrom, and through the foot plate 2'.

Numerals 35, 35' are open ended heat radiating air tubes, which surround the gas tubes 25, 25', and interconnect the said air chambers, thus forming a complete air duct therewith extending from the recuperators base to its upper end.

Also in this construction the advantage is obtained, that the recuperator's hottest lower section at 3' is first and directly cooled by a current of fresh combustion air, which is split up, and subdivided, ascends through a plurality of tubular air ducts to the exit 10', while the flue gases ascending into the dome 19', are returned therefrom through the gas tubes 25, 25' to the recuperator's base and are discharged in amply recooled condition through exit 6'.

As seen in Fig. 8, in the gas tubes 25', heat convecting rods 55 may be nested for cooperation therewith, by means of laps 75.

Good results under conditions of economy and safety were obtained with recuperators redesigned, according to this invention, wherein the gases were recooled from 1100° C. to 400° C., while the combustion air was heated up from normal to temperatures of 500° to 700° centigrade.

I am aware that from French Patent 1,103,445 an annularly internested arrangement of metal tubes and shells is known per se in another type of combination recuperators, where the hottest section of the master shell is immersed in a fusing ceramic mass, and has affixed accessorial metallic elements; and I make no claim to that combination or arrangement.

It can thus be seen, that there has been provided in accordance with the invention a recuperator structure which has an upright tubular element defined by a wall which has an outer surface and an inner surface and opposite open ends. A first inlet conduit for a first relatively hot gaseous medium leads into the open end of the lower part of said tubular element, said inner surface of said wall being adapted to guide said first medium through said upright tubular element. A first outlet conduit for said first medium is located exteriorly of said wall of said tubular element and in the vicinity of said open end of the lower part of said tubular element. Said recuperator structure is further characterized by a first ring-shaped chamber, a second ring-shaped chamber, a second inlet conduit for a second relatively cold gaseous medium in communication with said first chamber and located adjacent said open end and at a level above said first outlet conduit for said first medium.

The aforesaid first chamber has a tubular end wall which extends from said first chamber upwardly and outwardly and spaced from said wall of said tubular element to thereby define between the latter and said tubular end wall a hollow wall or a second chamber, whereby said outer surface of said tubular element forms the inner boundary of said second chamber. There are further provided means establishing connection between said first chamber and said second chamber and located approximately at a level with and opposite said second inlet conduit. A plurality of tubes having upper and lower open ends are accommodated in said second chamber and extend in spaced relation to each other and spaced from the outer surface of the tubular element and from said tubular end wall, said second chamber being closed by upper and lower terminal walls. The aforesaid upper and lower open ends of said tubes are located beyond these upper and lower terminal walls and outside said second chamber and are in communication with said tubular element and said first outlet conduit, respectively, whereby said first medium upon streaming from said lower open end of said tubular element through the latter is diverted into the upper open ends of said tubes for discharge through said lower open ends of said tubes and thence through said first outlet conduit. A second outlet conduit is further arranged in the recuperator for discharge of said second medium and in communication with said second chamber, said second outlet conduit being located at a level below the upper terminal wall of said second chamber, so that said second medium enters said first chamber, thence streams through said connection means into and upwardly in said second chamber and in the same direction as said first medium when passing along the inner surface of said tubular element, said second medium when streaming through the spaces between said tubes in said second chamber being guided in counter direction to the stream of said first medium within said tubes and out of said second outlet conduit.

Various changes and modifications may be made without departing from the spirit and scope of the present invention, and it is intended that such obvious changes and modifications be embraced by the annexed claims.

Having thus described the invention, what is claimed as new and desired to be secured by Letters Patent is:

1. A recuperator structure comprising an upright tubular element having a lower part and an upper part, said tubular element being defined by a wall having an outer and inner surface and an open end, a first inlet conduit for a first relatively hot gaseous medium located in the lower part of and leading into said open end of said tubular element, said inner surface of said wall being adapted to guide said first medium from said open end in said lower part to the upper part of said upright tubular element, a first outlet conduit for said first medium located exteriorly of said wall of said tubular element and in the vicinity of said open end, a first ring-shaped chamber, a second ring-shaped chamber, a second inlet conduit for a second relatively cold gaseous medium in communication with said first chamber and located adjacent said open end and at a level above said first outlet conduit for said first medium, said first chamber having a tubular end wall extending from said first chamber upwardly and outwardly spaced from said wall of said tubular element to thereby define between the latter and said tubular end wall the said second ring shaped chamber, whereby said outer surface of said tubular element forms the inner boundary of said second chamber, means establishing connection between said first chamber and said second chamber and located approximately at a level with and opposite said second inlet conduit, a plurality of tubes having upper and lower open ends and accommodated in said second chamber and extending in spaced relation to each other and spaced outwardly from the outer surface of the tubular element and inwardly from the inner surface of said tubular end wall, said second chamber having upper and lower terminal walls, said upper and lower ends of said tubes being located beyond said upper and lower terminal walls and outside said second chamber and being in communication with said tubular element and said first outlet conduit, respectively, whereby said first medium upon streaming from said open end through said tubular element is diverted into the upper open ends of said tubes for discharge through said lower open ends of said tubes and thence through said first outlet conduit, and a second outlet conduit for discharge of said second medium and in communication with said second chamber, said second outlet conduit being located at a level below said upper terminal wall of said second chamber, so that said second medium enters said first chamber, thence streams through said connection means into and upwardly in said second chamber and in the same direction as said first medium when passing along the inner surface of said tubular element, said second medium when streaming through the spaces between said tubes in said second chamber being guided in counter direction to the stream of said first medium within said tubes and out of said second outlet conduit.

2. A recuperator operating through heat radiation and heat convection; comprising a centrally disposed upright tubular element having a lower part with a first open end and an upper part with a second open end said tubular element being defined by a wall having an outer and an inner surface, a first inlet conduit located in the lower part of and connected to said first open end of said tubular element for introducing a first relatively hot gaseous medium through said tubular element along said inner surface of said wall, a first outlet conduit for said first medium located exteriorly of and in contact with a portion of the outer surface of said wall of said tubular element, a first ring-shaped chamber, a second ring-shaped chamber, a second inlet conduit for a second relatively cold gaseous medium in communication with said first chamber and located above and adjacent said first inlet for said first medium, said first chamber including a tubular end wall extending parallel to and upwardly and spaced from said outer surface of the wall of said tubular element thereby defining between the latter and said tubular end wall, a second chamber, a passageway leading from said first chamber into and establishing communication with said second chamber, a plurality of upright tubes accommodated in said second chamber and extending in spaced relation to each other and spaced from the outer surface of said tubular element and from the inner surface of said tubular end wall, said tubes terminating in opposite upper and lower open ends, said second chamber being defined by upper and lower terminal walls, said upper and lower open ends of said ends of said tubes being located beyond said upper and lower terminal walls of said second chamber and being in communication with said second open end of said tubular element and said first outlet conduit, respectively, whereby said first medium upon streaming from said first inlet conduit through said first open end of said tubular element into the latter is first diverted from said second open end of said tubular element into the upper open ends of said tubes and thence for discharge via said lower ends of said tubes through said first outlet conduit, and a second outlet conduit for said second medium in communication with said second chamber and located at a level below said upper terminal wall of said second chamber, so that said second medium when entering said first chamber streams through said passageway upwardly in said second chamber past said tubes therein and in the same direction as said first medium moving along said inner surface of and within said tubular element, said first medium when entering the open upper ends of said tubes for discharge through the lower open ends of the latter via said first outlet conduit streaming in counter direction to said second medium, which is guided through said second chamber along said outer surface of said wall of said tubular element for discharge from said second outlet conduit, whereby said first medium transfers its heat through radiation via the inner surface of said wall of said tubular element and then through convection via said tubes and said outer surface of said wall of said tubular element to said second medium.

3. A recuperator structure comprising an upright tubular element having a lower part and an upper part, said tubular element being defined by a wall having an outer and inner surface, a first inlet conduit for a first relatively hot gaseous medium located in said lower part of and in communication with said tubular element, said first medium from said first inlet conduit being guided along said inner surface of said wall from said lower part to the upper part of said upright tubular element, a first outlet conduit for said first medium located exteriorly of said wall of said tubular element and in the vicinity of said first inlet conduit, a first ring-shaped chamber, a second ring-shaped chamber, a second inlet conduit for a second relatively cold gaseous medium in communication with said first chamber and located adjacent said first inlet conduit and at a level above said first outlet conduit for said first medium, said second chamber being defined by a space bounded by a tubular end wall and the outer surface of said wall of said tubular element from which said tubular end wall is spaced and concentric with the latter, said second chamber being further determined by upper and lower terminal walls, said first chamber being bounded by said tubular end wall, means establishing connection between said first chamber and said second chamber and located approximately at a level with and opposite said second inlet conduit, a plurality of tubes accommodated in said second chamber and extending in spaced relation to each other and spaced from said outer surface and from the inner surface of said tubular end wall, said tubes being open at their opposite upper and lower ends, said upper and lower ends of said tubes projecting beyond said second chamber and being in communication with said tubular element and said first outlet conduit, respectively, a dome-shaped member mounted above said tubular element, said first medium upon streaming from said first inlet conduit through said tubular element being diverted through said dome-shaped member into the upper open ends of said tubes for discharge through said lower open ends of said tubes and thence through said first outlet conduit, and a second outlet conduit for said second medium in communication with said second chamber and positioned remote from said second inlet conduit for said second medium, said second medium upon entering said first chamber streaming upwardly in said second chamber and in the same direction as said first medium passing through said tubular element, said first medium upon entering the open upper ends of said tubes for discharge through the lower open ends of the latter via said first outlet conduit streaming in counter direction to said second medium in said spaces between said tubes located in said second chamber for discharge from said second outlet conduit.

References Cited in the file of this patent

FOREIGN PATENTS 1,103,445     France _____ Nov. 3, 1955